United States Patent Office 3,219,682
Patented Nov. 23, 1965

---

3,219,682
METHOD OF PRODUCING CYCLIC
ETHYLENEBORONATES
William G. Woods, Anaheim, Calif., and Riley O. Schaeffer, Bloomington, Ind., assignors to United States Borax & Chemical Corporation, Los Angeles, Calif., a corporation of Nevada
No Drawing. Filed Oct. 26, 1962, Ser. No. 233,433
8 Claims. (Cl. 260—462)

This invention relates to a method of producing cyclic ethyleneboronates, and more particularly, this invention relates to a method of producing B-vinyl dioxaborolane and dioxaborinane compounds.

The cyclic ethyleneboronates provided by this invention are the compounds represented by the formula

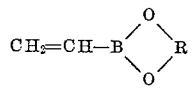

where R is an alkylene radical of 2 to 3 carbon atoms in length and containing a total of from 2 to about 20 carbon atoms. When R is an alkylene radical of 2 carbon atoms in length, the compound contains a 1,3-dioxa-2-borolane ring. When R is an alkylene radical of 3 carbon atoms in length, the boron-containing ring is a 1,3-dioxa-2-borinane. The carbon atoms of the ring can be unsubstituted or they can be substituted with one or more alkyl groups, such as the lower alkyl groups having 1 to about 8 carbon atoms. The compounds are useful as chemical intermediates for preparing other substituted dioxaborolane and dioxaborinane compounds and as monomers for homopolymerization or copolymerization to provide useful polymers as described in Williams G. Woods' copending application with I. S. Bengelsdorf and D. L. Hunter, Serial Number 139,343, filed September 20, 1961.

It is, therefore, the principal object of this invention to provide a method of producing cyclic ethyleneboronates. It is a further object of this invention to provide a method of producing B-vinyl 1,3-dioxa-2-borolane and 1,3-dioxa-2-borinane compounds. Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The present invention provides a method of producing a cyclic ethyleneboronate represented by the formula

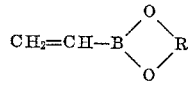

which comprises the reaction of a vinyl halide with a trisglycol biborate represented by the formula

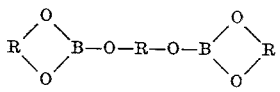

in the presence of sodium dispersed in an inert organic solvent, where R represents an alkylene radical of 2 to 3 carbon atoms in length and containing a total of from 2 to about 20 carbon atoms.

The reaction can be represented by the equation:

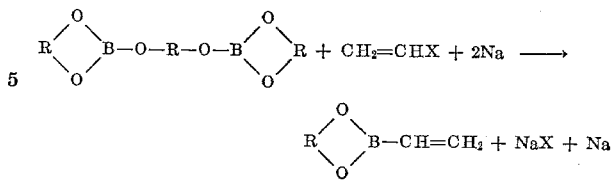

complexes, where X is a halogen atom such as chlorine or bromine, and R has the significance previously assigned. As indicated, complex-type by-products are also formed, the structures of which have not as yet been established. For best yields of the desired product, a biborate:vinyl halide:sodium molar ratio of about 1:1:2 is preferred, although additional sodium is sometimes advantageous.

The reaction is initiated by combining, in a suitable reaction vessel, the biborate and vinyl halide in the presence of a dispersion of metallic sodium in an inert organic solvent. Examples of suitable inert organic solvents include the hydrocarbon solvents, such as cyclohexane and toluene, and the ethereal solvents, such as diethyl ether and diisopropyl ether. The reaction takes place at a temperature in the range of about 25° C. to about 150° C., and preferably at a temperature of about 30° to 50° C. The desired product is isolated and purified by conventional procedures, such as by fractional distillation under reduced pressure. In some cases it is advantageous to separate the insoluble by-products from the reaction mixture, such as by filtration or by centrifugation and decantation, prior to distillation under reduced pressure.

The reactants are well known to the art, being readily available. The tris glycol biborates can be prepared, for example, by the reaction of 1,2- or 1,3-glycol with boric acid in a 3:2 molar ratio as taught by Dupire, Comp. rend. 202, 2086 (1936) and United States Patent Number 2,741,548. Examples of suitable tris glycol biborate reactants include:

Tris(2-methyl-2,4-pentanediol)biborate
Tris(2,4-pentanediol)biborate
Tris(2-ethyl-2-n-butyl-1,3-propanediol)biborate
Tris(2,2-diethyl-1,3-propanediol)biborate
Tris(1,3-propanediol)biborate
Tris(1,2-ethanediol)biborate
Tris(1-methyl-1,2-ethanediol)biborate
Tris(1,3-butanediol)biborate Other examples of useful reactants for the process will be obvious to those skilled in the art.

The following example illustrates the method of this invention but is not intended to limit the scope of the invention as modifications and equivalents will be obvious to those skilled in the art.

Example

A dispersion of 5.60 grams (0.25 gram-atom) of sodium was prepared in 150 ml. of hot toluene and the toluene then replaced with 150 ml. of diethyl ether by decantation. Vinyl chloride was passed into a solution of 46.3 grams (0.125 mole) of tris(2-methyl-2,4-pentanediol)biborate in 85 ml. of diethyl ether until about 11 grams (0.18 mole) had dissolved. This solution was added slowly to the stirred sodium dispersion at about 5°–10° C. The resulting mixture was allowed to warm to about room temperature, where an exothermic reaction commenced, and the temperature maintained at about 49° C. for one hour. The resulting slurry was centrifuged at 1500 r.p.m. for 20 minutes, the cloudy-grey liquid was decanted, and the solids washed with 50 ml. of ether and recentrifuged. A sample of the combined ether solutions was analyzed by gas chromatography at 190° C. and showed 2-vinyl-4,4,6-trimethyl-1,3-dioxa-2-borinane present in a 25–30% yield.

The crude product can be fractionally distilled under reduced pressure to give the pure compound, B.P. 69–70° C./35 mm.

Other modes of applying the principle of the invention may be employed, change being made as regards the details described, provided the features stated in any of the following claims or the equivalent of such be employed.

We, therefore, particularly point out and distinctly claim as our invention:

1. The method of producing a cyclic ethyleneboronate represented by the formula

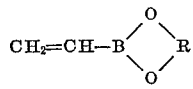

which comprises the reaction at a temperature in the range of about 25° C. to about 150° C. of a vinyl halide selected from the group consisting of vinyl chloride and vinyl bromide with a tris glycol biborate represented by the formula

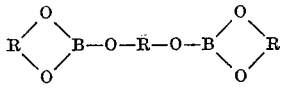

in the presence of metallic sodium dispersed in an inert organic solvent, in which the molar ratio of said vinyl halide:biborate:sodium is about 1:1:2, where R represents an alkylene radical of 2 to 3 carbon atoms in length and containing a total of from 2 to about 20 carbon atoms.

2. The method of claim 1 in which said R is 1,1,3-trimethylpropylene.

3. The method of claim 1 in which said reaction takes place at a temperature in the range of about 30° C. to about 50° C.

4. The method of claim 1 in which said inert organic solvent is an ethereal solvent.

5. The method of producing a cyclic ethyleneboronate represented by the formula

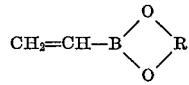

which comprises combining, in substantially equimolar amounts, vinyl chloride and a tris glycol biborate represented by the formula

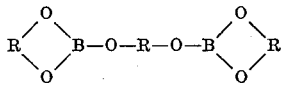

in the presence of at least two molar equivalents of metallic sodium per mole of vinyl chloride, said metallic sodium dispersed in an ethereal solvent, at a temperature in the range of about 25° C. to about 150° C., and separating said cyclic ethyleneboronate from the resulting reaction mixture by distillation under reduced pressure; where R is an alkylene radical of 2 to 3 carbon atoms in length and containing a total of from 2 to about 20 carbon atoms.

6. The method of claim 5 in which said R is 1,1,3-trimethylpropylene.

7. The method of claim 5 in which the reaction temperature is in the range of about 30° to 50° C.

8. The method of claim 5 in which the insoluble by-products are separated from said reaction mixture prior to distillation under reduced pressure.

References Cited by the Examiner

UNITED STATES PATENTS 3,030,406   4/1962   Washburn et al. _____ 260–462

CHARLES B. PARKER, *Primary Examiner.*

L. D. ROSDOL, *Examiner.*